Figure 1:
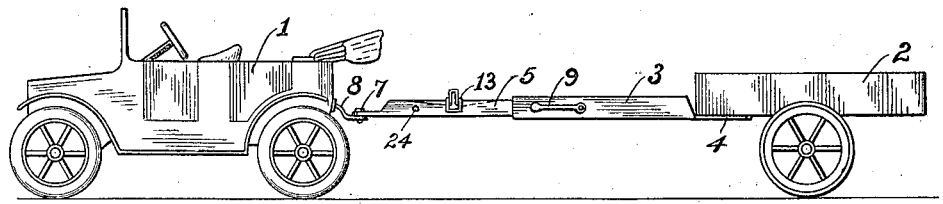

M. C. KIRNER.
EXTENSION COUPLING FOR AUTOMOBILE TRAILERS.
APPLICATION FILED JULY 30, 1915.

1,178,857.

Patented Apr. 11, 1916.

Inventor
M. C. Kirner
By
his Attorney

UNITED STATES PATENT OFFICE.

MILTON C. KIRNER, OF CLEVELAND, OHIO.

EXTENSION-COUPLING FOR AUTOMOBILE-TRAILERS.

1,178,857.  Specification of Letters Patent.  Patented Apr. 11, 1916.

Application filed July 30, 1915. Serial No. 42,719.

*To all whom it may concern:*

Be it known that I, MILTON C. KIRNER, a citizen of the United States, residing at Cleveland, in the county of Cuyahoga and State of Ohio, have invented certain new and useful Improvements in Extension-Couplings for Automobile-Trailers, of which the following is a specification.

This invention relates to a coupling device for connecting a cart or trailer to an automobile, and has for its main object to provide a coupling of simple construction, which may be extended when desired so that the trailer will follow the automobile at a sufficient distance to permit the safe carrying of ladders and the like.

Another object of the invention is to provide such coupling with a cross-bar for supporting the forward ends of the ladders, and to so make the cross-bar that it may be swung to a longitudinal position in order not to interfere with the longitudinal adjustment of the coupling.

With the above and other objects in view as will be readily understood, the invention will be hereinafter fully described with reference to the accompanying drawing, which simply illustrates a preferred embodiment thereof, and the novel features of the invention will be distinctly pointed out in the appended claims.

In the drawings, like characters of reference indicate corresponding parts.

Figure 2:
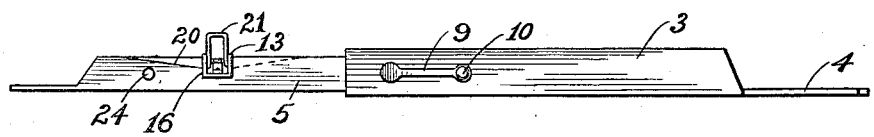
Figure 3:
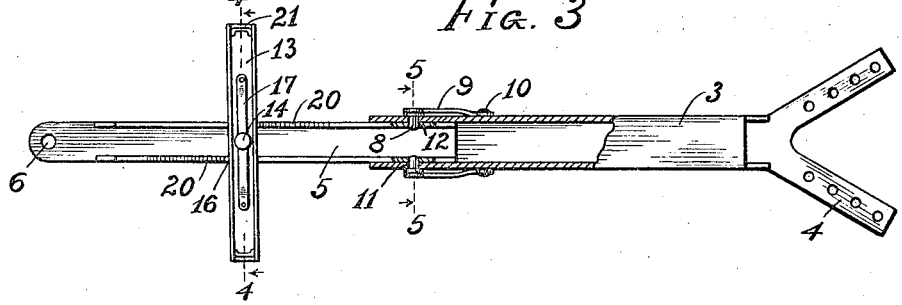
Figure 4:
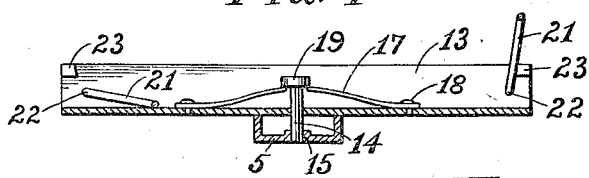
Figure 5:
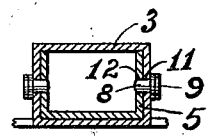
Figure 6:
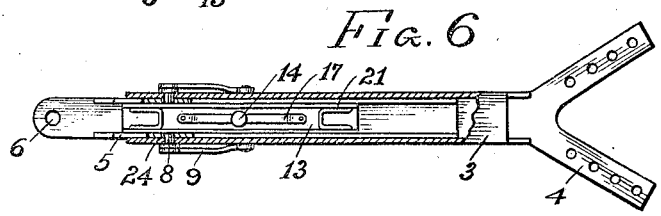

Figure 1 is a view illustrating a trailer connected to an automobile by the use of my invention, Fig. 2 is a side elevation of the coupling, Fig. 3 is a plan view of same, certain parts being broken away to better show the construction, Fig. 4 is a sectional view, on an enlarged scale, on line 4—4 of Fig. 3, Fig. 5 is a cross section, taken on line 5—5 of Fig. 3, and Fig. 6 is a plan view showing the coupling in its now-extended position.

In the drawings, the automobile is represented by 1, and the cart or trailer drawn by the automobile is indicated by 2. The coupling consists of an elongated box or tube 3, which is preferably rectangular in cross section and constructed of plate steel. This tube terminates at its rear end in a forked member 4 for permanent attachment to the trailer. Slidably mounted in the front end of said tube is a channel member 5, the front or free end of which is adapted to be easily connected by any suitable means to the rear of the automobile, or quickly detached therefrom. As shown, the front end of the channel member is provided with an opening 6 for receiving a bolt 7, which enters the eye of a bracket 8 fixed to the automobile. The channel member 5, when in its extended position, is locked to the tube 3, by means of a pair of pins 8 carried by springs 9 which are fixed to the sides of the tube at 10. Said pins pass through apertures 11 in the tube, and enter alining apertures 12 in the sides of the channel member.

An important feature of this invention is the cross-bar for supporting the front ends of ladders and the like. Said cross-bar consists of a piece of channel iron 13, which is pivotally connected to the channel member 5 by means of a bolt 14 rigidly secured thereto at 15. Recesses 16 are provided in the sides of the channel member for accommodating the cross-bar and a pair of suitable flat springs 17, which are fixed thereto at 18 with their free ends pressing upwardly under the head 19 of the bolt 14, tend to hold the cross-bar in said recesses. When it is desired to use the coupling in its non-extended position, the cross-bar may be lifted out of the recesses, against the action of the springs 17, and swung clockwise until brought in longitudinal alinement with the channel member 13. The springs will then force the cross-bar within the channel member, so as not to interfere with the sliding movement thereof within the tube 3. The upper edges of the opposite sides of the channel member 5 are cut down at 20, so that they incline toward the recesses 16, and will serve as cams to raise the cross-bar, against the action of the springs 17, when being swung to its longitudinal position. For the purpose of retaining the ladders, upon the cross-bar, bracket arms 21 are arranged at each end thereof, and in order that they may be folded within the channel iron to allow the channel member 13 to be slid within the tube, said bracket arms are pivotally connected to the channel iron at 22, and stop blocks 23 are provided to hold them in their upright positions. The channel member 13 is locked within the tube 3 in its non-extended position, by means of the spring pressed pins 8 entering apertures 24 in the sides thereof near its forward end.

As will be understood from the above, a trailer may be connected to an automobile by means of this coupling, either to follow closely, or when it is desired to carry ladders and the like, at some distance behind the automobile by simply extending the coupling. This makes the trailer more valuable to plumbers, painters and other workmen, who find it necessary to transport tools or material of great lengths. It will be understood that the details of construction may be varied within the scope of the claims.

Having fully described my invention, what I claim is:

1. In a coupling, the combination of an elongated box, a member slidably mounted within the box, a cross-bar pivotally connected to said member, the member being provided with recesses for receiving the cross-bar, and springs tending to hold the cross-bar in said recesses, substantially as described.

2. In a coupling, the combination of a tube, a channel member slidably mounted within the tube, means for locking the channel member to the tube, a cross-bar pivotally connected to the channel member, the sides of the channel member being provided with recesses for receiving the cross-bar, and springs for holding the cross-bar in said recesses but which will permit the cross-bar to be disengaged therefrom to be swung within the channel member, substantially as described.

3. In a coupling, the combination of a tube, a channel member slidably mounted within the tube, means for locking the channel member to the tube, a cross-bar pivotally connected to the channel member, the sides of the channel member being provided with recesses for receiving the cross-bar, springs for holding the cross-bar in said recesses but which will permit the cross-bar to be disengaged therefrom to be swung on its pivot, and the sides of the channel member being inclined toward the recesses to serve as cams for raising the cross-bar as it is swung in longitudinal alinement with said channel member, substantially as described.

4. In a coupling, the combination of a tube adapted to have one end fixed to a trailer, a channel member telescopically mounted in the tube, means for locking the channel member to the tube in either extreme position, means for removably connecting the free end of the channel member to an automobile, a channel iron carried by the channel member, the sides of the channel member being provided with recesses for receiving the channel iron, a bolt passing through the channel iron and being fixed in the channel member, springs fixed to the channel iron and tending to press upwardly under the head of said bolt for holding the channel iron in said recesses, the sides of the channel member being inclined toward the recesses to serve as cams for raising the channel iron as it is swung on said bolt to longitudinal alinement with said channel member, bracket arms pivoted to the channel iron, and stop blocks for holding them in an upright position, substantially as described.

In testimony whereof I affix my signature.

MILTON C. KIRNER.